United States Patent
Schneider et al.

(12) 
(10) Patent No.: US 6,705,641 B2
(45) Date of Patent: Mar. 16, 2004

(54) INFLATABLE SEAT BELT SYSTEM (75) Inventors: David W. Schneider, Waterford, MI (US); Michael K. Hishon, New Baltimore, MI (US)

(73) Assignee: Autoliv ASP, Inc., Ogden, UT (US)

( * ) Notice: Subject to any disclaimer, the term of this patent is extended or adjusted under 35 U.S.C. 154(b) by 84 days.

(21) Appl. No.: 10/094,079

(22) Filed: Mar. 8, 2002

(65) Prior Publication Data

US 2003/0168837 A1 Sep. 11, 2003

(51) Int. Cl.$^7$ ................................................ B60R 21/18
(52) U.S. Cl. ........................ 280/733; 280/808; 297/484
(58) Field of Search .............................. 280/733, 801.1, 280/801.2, 808; 297/468, 470, 483, 484

(56) References Cited

U.S. PATENT DOCUMENTS

| | | | | |
|---|---|---|---|---|
| 3,865,398 A | * | 2/1975 | Woll | ........................ 280/733 |
| 3,905,615 A | | 9/1975 | Schulman | |
| 3,948,541 A | | 4/1976 | Schulman | |
| 4,231,616 A | * | 11/1980 | Painter | ........................ 297/481 |
| 4,302,049 A | * | 11/1981 | Simpson | ........................ 297/484 |
| 5,758,900 A | | 6/1998 | Knoll et al. | |
| 5,839,753 A | | 11/1998 | Yaniv et al. | |
| 5,851,055 A | | 12/1998 | Lewis | |
| 6,049,954 A | * | 4/2000 | Britto | ........................ 24/579.11 |
| 6,076,894 A | * | 6/2000 | Busch | ........................ 297/484 |
| 6,126,194 A | * | 10/2000 | Yaniv et al. | ................ 280/733 |
| 6,237,945 B1 | | 5/2001 | Aboud et al. | |
| 6,340,173 B1 | * | 1/2002 | Specht | ........................ 280/733 |
| 6,375,218 B2 | * | 4/2002 | Iseki | ........................ 280/733 |
| 6,585,289 B1 | * | 7/2003 | Hammer et al. | ............ 280/733 |

FOREIGN PATENT DOCUMENTS

| | | |
|---|---|---|
| EP | 1 031 472 A2 | 2/2000 |
| WO | WO-98/51542 | 11/1998 |

* cited by examiner

*Primary Examiner*—David R. Dunn
(74) *Attorney, Agent, or Firm*—James D. Erickson; Sally J. Brown (57) ABSTRACT

An inflatable seat belt system providing protection to its inflatable members is disclosed. The system may include inflatable shoulder belts and lap belts, which may or may not be inflatable. Each inflatable belt includes seat belt webbing having an interior cavity in which an inflatable member is placed. The seat belt webbing also includes a frangible seam that bursts upon inflation of the inflatable member. The inflatable seat belt system may also include one or more anti-submarining (crotch) belts that prevent an occupant from slipping underneath the protection of the lap and shoulder belts.

26 Claims, 6 Drawing Sheets

INFLATABLE SEAT BELT SYSTEM

BACKGROUND OF THE INVENTION

1. Field of the Invention

The present invention relates to a seat belt system. More specifically, the present invention relates to an inflatable seat belt system.

2. Technical Background

Seat belts are known to increase the safety of occupants in various motorized vehicles. Seat belt use is often cited as the most useful line of defense in reducing accident related injuries. The actions of consumer groups, governmental agencies, and political activists all reflect the tremendous societal value of seat belt use. Legislation requiring manufacturers to include seat belts in their vehicles has been in place for many years. Recently, laws have been enacted requiring consumers to use seat belts.

The benefits of seat belt use are numerous. In a collision, seat belts may prevent the occupant of a vehicle from striking the interior of the vehicle or other objects within the vehicle, including other occupants. Seat belts aid in keeping the occupant inside the vehicle, where the chances of survival are much greater. Seat belts may also keep the driver behind the wheel and in control of the vehicle in a collision, averting additional collisions, damage, or injuries. Seat belts also enhance the effectiveness of other safety devices. For example, in a vehicle with airbags, a seat belt keeps the occupant in the seat, so the airbag can better protect the occupant.

Seat belts vary in their configuration, but one of the most common types of seat belts is the lap belt. The lap belt includes right and left lap belts that traverse an occupant's lap and are secured to each other near the occupant's abdomen. The right and left belts may be secured together by a locking device that may include a latch plate and a buckle. Lap belts are found in many different types of vehicles throughout the world.

Although the lower body is restrained by conventional lap belts, these belts do not restrain the upper body, which may experience rapid and dangerous movement during an accident. This movement is particularly dangerous for passengers in the front seat of an automobile, who may strike the steering wheel, dashboard, or windshield during an accident.

A seat belt system having one or more shoulder belts limits an occupant's upper body movement in an accident. A 3-point seat belt system includes a lap belt and one shoulder belt that diagonally traverses the occupant's torso. Another type of seat belt system, which may be referred to as a 4-point seat belt, includes two lap belts and two shoulder belts that meet at a locking device.

As indicated above, to further protect an occupant of a vehicle, airbags have been developed. Airbags may be positioned in a variety of locations throughout the vehicle. Airbags located within the steering wheel aid in preventing the driver from striking the steering wheel and the windshield in the event of an accident. Airbags have also been placed in the dashboard directly in front of the passenger seat in a vehicle or in the interior sides of a vehicle to prevent occupants from striking the doors and windows of the vehicle during an accident.

Previously, sensors were placed in a vehicle's bumpers to determine when to deploy an airbag. A modern airbag, however, may include an electronic control unit (ECU). The ECU is usually installed in the middle of an automobile. The ECU includes a sensor that continuously monitors the acceleration and deceleration of the vehicle. The ECU sends this information to a processor that analyzes the information with an algorithm to determine whether the vehicle is in an accident.

When the processor determines that there is an accident situation, the ECU transmits an electrical signal to an initiator in, for example, an airbag module. The initiator triggers operation of the inflator. The inflator inflates a textile airbag to prevent injury to the passenger. In some airbag apparatuses, the airbag may be fully inflated within 50 thousandths of a second and deflated within two tenths of a second.

Airbag inflators come in a number of different varieties. Some inflators, which are often referred to as "stored gas inflators," simply store gas in a high-pressure state and release the gas during an impact. "Pyrotechnic" inflators, by contrast, do not store gas; rather, they contain propellants that, upon ignition, react to produce inflation gas. "Hybrid" inflators utilize compressed gas in combination with pyrotechnics to produce inflation gas. In some instances, the pyrotechnic can also open or rupture a chamber containing pressurized gases, allowing the pressurized gas to escape and inflate into an attached airbag.

In addition, to the embodiments discussed above, airbags have also been placed on seat belts to form what may be referred to as inflatable seat belts. Inflatable seat belts provide an additional element of protection to the occupant and also aid to stabilize the occupant's head and neck during an accident. These belts also provide a wider surface at which the occupant contacts the seat belt system, thereby distributing the force of the impact over a wider area of the occupant's body.

However, conventional inflatable seat belt systems suffer from a number of deficiencies. Often the inflatable members are not adequately protected from damage or wear and tear and thus may become useless, or even dangerous, over time. In some embodiments, additional layers of protection have been superimposed over airbags attached to the seat belt webbing, resulting in additional manufacturing time and material costs to a manufacturer. Furthermore, this additional protection may make an inflatable seat belt system cumbersome and difficult for consumers to use and may simply be unsightly.

Additionally, positioning the inflatable seat belt system relative to an occupant is critical to protecting an occupant during an accident. Moreover, maintaining the correct position of the inflatable seat belts is more difficult than with conventional seat belts because inflatable seat belts expand during an accident.

Consequently, there is a need, which is unfulfilled by the conventional systems, for an inflatable seat belt system that provides superior protection to inflatable members of the system so that the inflatable members may properly deploy in an accident.

SUMMARY OF THE INVENTION

The apparatus and methods of the present invention have been developed in response to the present state-of-the-art, and, in particular, in response to problems and needs in the art that have not yet been fully resolved by currently available inflatable seat belt systems. The present invention provides an apparatus for enhancing the effectiveness of inflatable seat belt systems. To achieve the foregoing, and in accordance with the invention as embodied and broadly described in the preferred embodiment, an inflatable seat belt system is disclosed which diminishes the risk of injury in an accident.

The inflatable seat belt system may include two shoulder belts and two lap belts. Each of the lap and shoulder belts may be coupled to a locking device, which is selectively lockable by an occupant. The locking device may include a latch plate and a buckle that may be selectively locked together.

Also, the inflatable seat belt system may include one or more anti-submarining (crotch) belts, which are also coupled to the locking device. The anti-submarining belts prevent an occupant from slipping down between the lap belts during an accident and striking objects. Of course, selected embodiments of the inflatable seat belt system may include one or two anti-submarining belts or none at all.

In one embodiment, the two shoulder belts are inflatable, as will be discussed in greater detail below. In such an embodiment, the lap belts may be made from conventional seat belt webbing and be attached to a vehicle (which may include the seat) using retractors or pretensioners, which are known to those skilled in the art.

A user may adjust a length of the inflatable shoulder belts using a cinching mechanism disposed within the locking device. Cinching mechanisms are known in the art and allow for adjustment of the length of the belts during loading of an occupant, but lock into place during rapid acceleration or deceleration that may accompany an accident. The locking device is located proximate an occupant's abdomen and hence the cinching mechanism is located near an occupant's hands and may be easily adjusted. Also, because the cinching mechanism is entirely disposed within the locking device (e.g., no cinching buckles are attached to the belts outside of the locking device), a wider range of adjustment levels is provided to the occupant. In addition, a larger portion of the shoulder belts may be inflatable to provide greater protection to an occupant.

In an alternative embodiment, both the shoulder and lap belts are inflatable. In such an embodiment, the inflatable lap belts may be fastened to a vehicle using any number of fixed fastening devices (e.g., bolts or rivets), rather than using retractors. Also, a cinching mechanism, as described above, may be disposed within the locking device for adjustment of the length of each the inflatable lap belts.

As stated, inflatable belts may include inflatable shoulder or inflatable lap belts. Each inflatable belt includes seat belt webbing having an interior cavity. An inflatable member may be disposed within the interior cavity. The belt webbing surrounding the inflatable member provides excellent protection to an inflatable member so that the inflatable member may properly deploy in an accident. Also, the seat belt webbing alleviates the need for additional costly and cumbersome protective devices to surround the inflatable members.

The seat belt webbing of the inflatable shoulder belts may also include a frangible seam that bursts upon inflation of an inflatable member. The frangible seam enables the inflatable members to fully inflate in an accident and provide protection to an occupant.

The inflatable seat belt system may also include a seat having two openings. The openings may be disposed within a fixed headrest of the seat. One of the shoulder belts passes through each of the openings. The openings helped to stabilize the inflatable seat belt system and maintain the correct position of the inflatable shoulder belts during an accident.

After passing through the openings, each of the inflatable shoulder belts may be attached to the rear side of the seat using a clamp or other retaining device. Alternatively, the inflatable shoulder belts may be attached to another portion of the vehicle, such as the floor.

In one embodiment, a separate inflator inflates each of the inflatable shoulder belts. Each inflator may be directly positioned within the corresponding inflatable member or may be in fluid communication with the inflatable member via a diffuser or gas guide. When two inflators are used, inflation of each of the inflatable shoulder belts may occur at different times or with varying amounts of filler medium (e.g., gas or foam). Thus, inflation sequences may vary according to the type of accident detected by sensors within the vehicle.

Alternatively, a single inflator may inflate both inflatable shoulder belts. Thus, the single inflator may be in fluid communication with both inflatable seat belts using, for instance, a diffuser or gas guide.

Each of the inflators described above may be attached to the rear side of the seat or could be positioned at other locations within the vehicle, such as within the seat. Also, each of the inflators described above could be in fluid communication with the inflatable lap belts. Alternatively, one or more separate inflators could be provided for inflation of the inflatable lap belts.

This invention presents a significant advancement in the art in that it provides superior protection to inflatable members of an inflatable seat belt system by surrounding each inflatable member with seat belt webbing. In addition, a cinching mechanism for adjusting the length of an inflatable belt is conveniently located for adjustment by an occupant. Also, openings within the seat, through which inflatable shoulder belts pass, provide additional stability to the inflatable seat belt system and help to maintain the inflatable shoulder belts in the correct position to protect an occupant during an accident.

These and other possible advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings illustrate only selected embodiments of the invention and are not therefore to be considered limiting in scope, the invention will be described and explained with additional specificity and detail through the use of the accompanying drawings in which.

DETAILED DESCRIPTION OF THE PREFERRED EMBODIMENTS

The preferred embodiments of the invention are now described with reference to FIGS. 1–7, where like reference numbers indicate identical or functionally similar elements. The members of the present invention, as generally described and illustrated in the Figures, may be implemented in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

Furthermore, the particular features, structures, or characteristics may be combined in any suitable manner in one or more embodiments. In the following description, numerous specific details are provided to convey a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
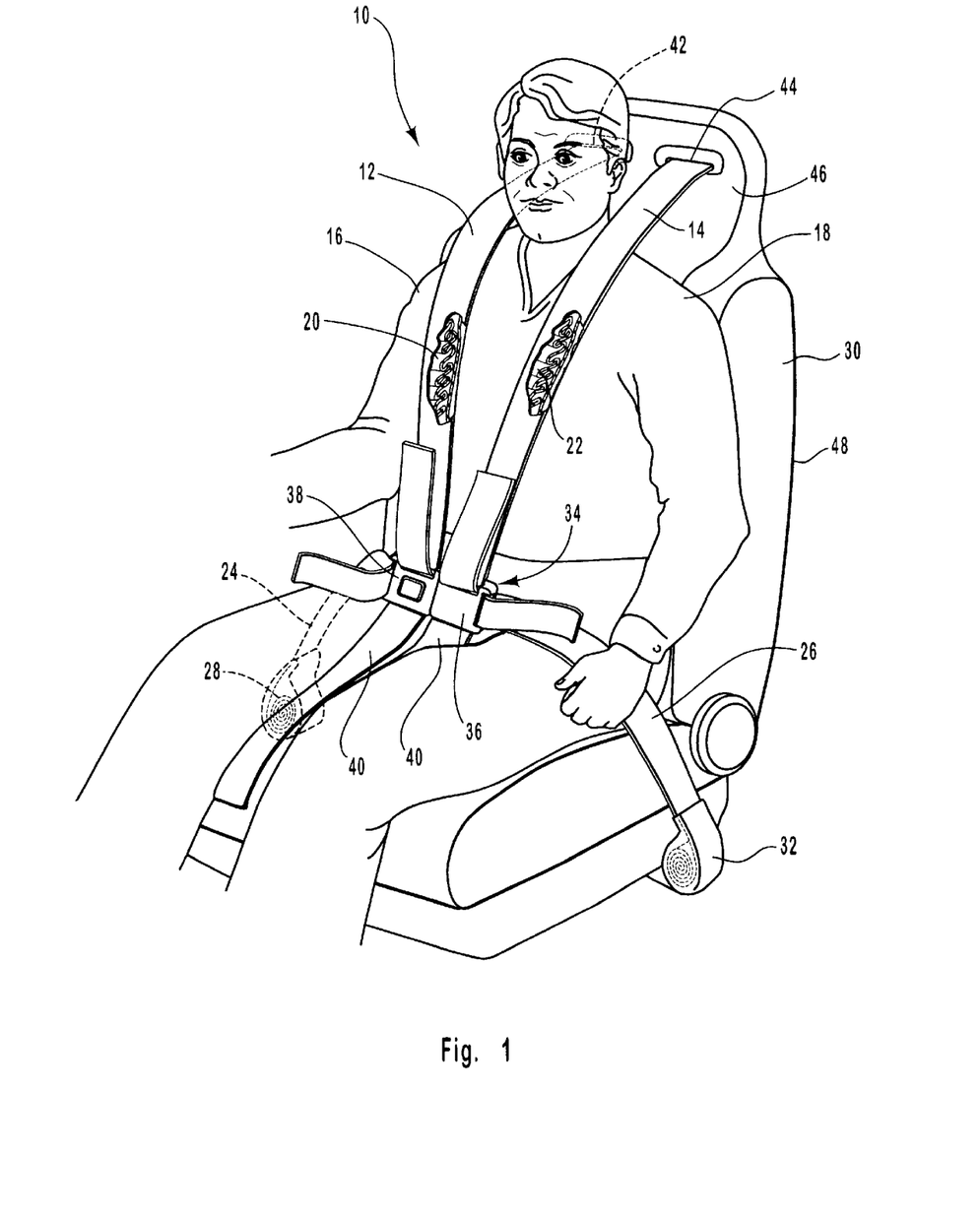
FIG. 1 is a partially cut away perspective view of an inflatable seat belt system that includes inflatable shoulder belts.

FIG. 1 shows a perspective view of an inflatable seat belt system 10. The inflatable seat belt system 10 may include a first and a second shoulder belt 12, 14. The first and second shoulder belts 12, 14 restrain a torso 16 of occupant 18 from being thrust forward or to one side or the other during an accident.

Each shoulder belt 12, 14 may inflate to protect an occupant of a vehicle during an impact. Thus, a first inflatable member 20 may be disposed, or at least partially disposed, within the first shoulder belt 12 and a second inflatable member 22 may be disposed, or at least partially disposed, within the second shoulder belt 14, as will be discussed in greater detail below.

The inflatable seat belt system 10 may also comprise a first and a second lap belt 24, 26. In one embodiment, each lap belt 24, 26 may be made using conventional seat belt webbing. The inflatable seat belt system 10 may include a first and a second retractor 28, 32. The first retractor 28 secures the first lap belt 24 to a vehicle (which may include the seat 30), and the second retractor 32 secures the second lap belt 26 to the vehicle. Of course, the first and second lap belts 24, 26 may be secured to the vehicle without the use of retractors 28, 32.

The inflatable seat belt system 10 may also have a locking device 34, having a latch plate 36 and a buckle 38. The locking device 36 is selectively lockable by an occupant of a vehicle. Locking devices 34 are known to those skilled in the art. As illustrated, the locking device 34 may be coupled to each of the shoulder belts 12, 14 and each of the lap belts 24, 26.

The inflatable seat belt system 10 may include one or more anti-submarining (crotch) belts 40. The anti-submarining belt 40 serves to prevent an occupant 18 from sliding out (submarining) from underneath the protection of the inflatable seat belt system 10 during an accident.

Each anti-submarining belt 40 is coupled at one end to the locking device 34 and at the other end to another part of the vehicle, such as the seat 30 or floor (not shown). As illustrated, the inflatable seat belt system may include two anti-submarining belts 40. Alternatively, only a single anti-submarining belt 40 is included, which may be attached to either the latch plate 36 or buckle 38. Of course, in one embodiment of the inflatable seat belt system 10, no anti-submarining belt 40 is included.

The inflatable seat belt system 10 may also have a first and a second opening 42, 44 disposed within the seat 30 for receiving the first and second shoulder belts 12, 14, respectively. The openings 42, 44 may maintain the first and second shoulder belts 12, 14 in the correct position during loading of an occupant 18. In one embodiment, the first and second openings 42, 44 are disposed within a fixed headrest 46 of the seat 30. Placing the openings within the seat 30 or a fixed headrest 46 thereof, as opposed to a movable headrest, provides extra support to ensure that the shoulder belts 12, 14 are correctly positioned both before and during an accident. Of course, the openings 42, 44 may be disposed at other locations within the seat 30. Also, the shoulder belts 12, 14 may be positioned over or above the seat 30 and attach to a portion of the vehicle behind the seat 30 or to a rear side 48 of the seat 30.

Figure 2:
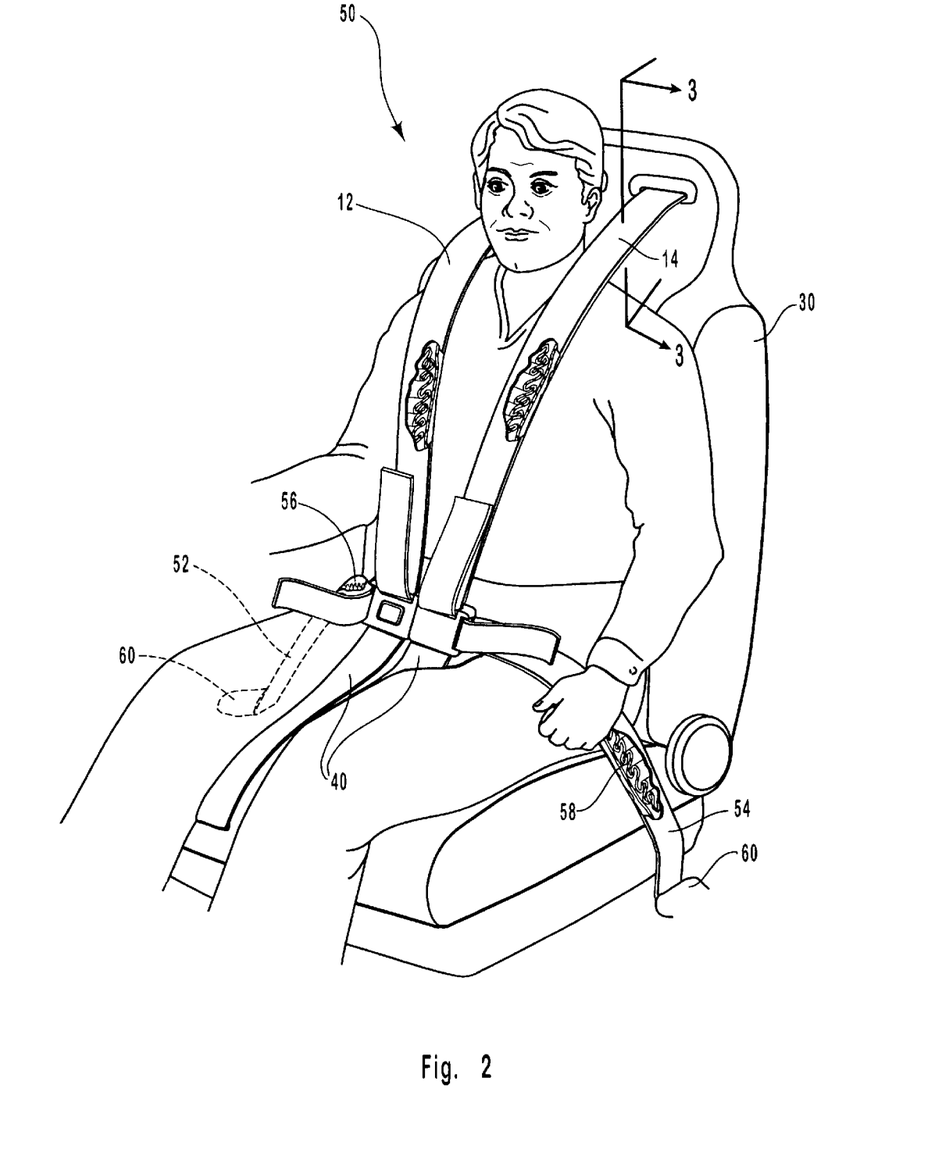
FIG. 2 is a partially cut away perspective view of an inflatable seat belt system that includes inflatable shoulder and lap belts.

FIG. 2 is a perspective view of an alternative embodiment of the inflatable seat belt system 50 that includes both inflatable shoulder belts 12, 14 and inflatable lap belts 52, 54. Thus, a third inflatable member 56 may be disposed, or at least partially disposed, within the first lap belt 52 and a fourth inflatable member 58 may be disposed, or at least partially disposed, within the second lap belt 54, as will be described in greater detail below. In such a scenario, the distal ends 60 of each lap belt 52, 54 may be attached to a portion of the vehicle, such as the seat 30 rather than retractors 28, 32.

Again, in one embodiment, the inflatable seat belt system 50 may include either one or more anti-submarining belts 40. Of course, the seat belt system 50 may be configured without an anti-submarining belt 40.

Figure 3A:
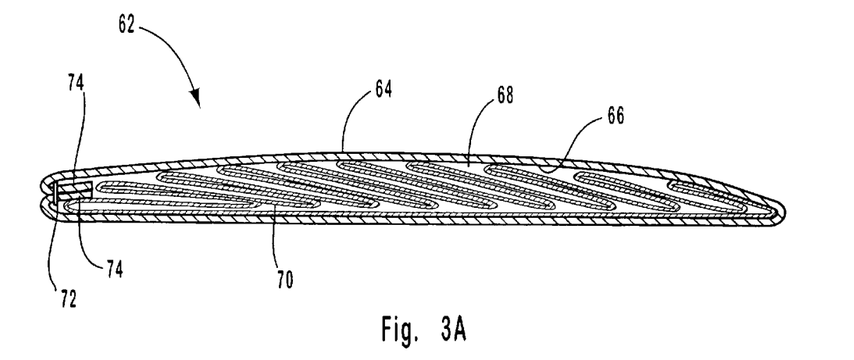
FIG. 3a is a cross-sectional view of an inflatable belt in an uninflated state.

FIG. 3a is a cross-sectional view of an inflatable belt 62 (e.g., an inflatable shoulder belt 12, 14 or an inflatable lap belt 52, 54) in an inflated state. Each belt 62 may include seat belt webbing 64 having an interior surface 66 defining an interior cavity 68.

An inflatable member 70 (e.g., a first, second, third or fourth inflatable member 20, 22, 56, 58) may be disposed, or at least partially disposed, within the interior cavity 68 of each inflatable belt 62. The inflatable member 70 may be constructed using materials, fabrics, and techniques known to those skilled in the art for the construction of airbags. For instance, the inflatable member 70 may be made from a porous material allowing for rapid deflation following inflation. Also, various types of folds (e.g., an accordion fold) may be used to position the inflatable member 70 within the interior cavity 68. Each type of fold results in a different type of deployment. Also, the inflatable member 70 may be fixedly attached (e.g., sewn or riveted) to the seat belt webbing 64.

Figure 3B:
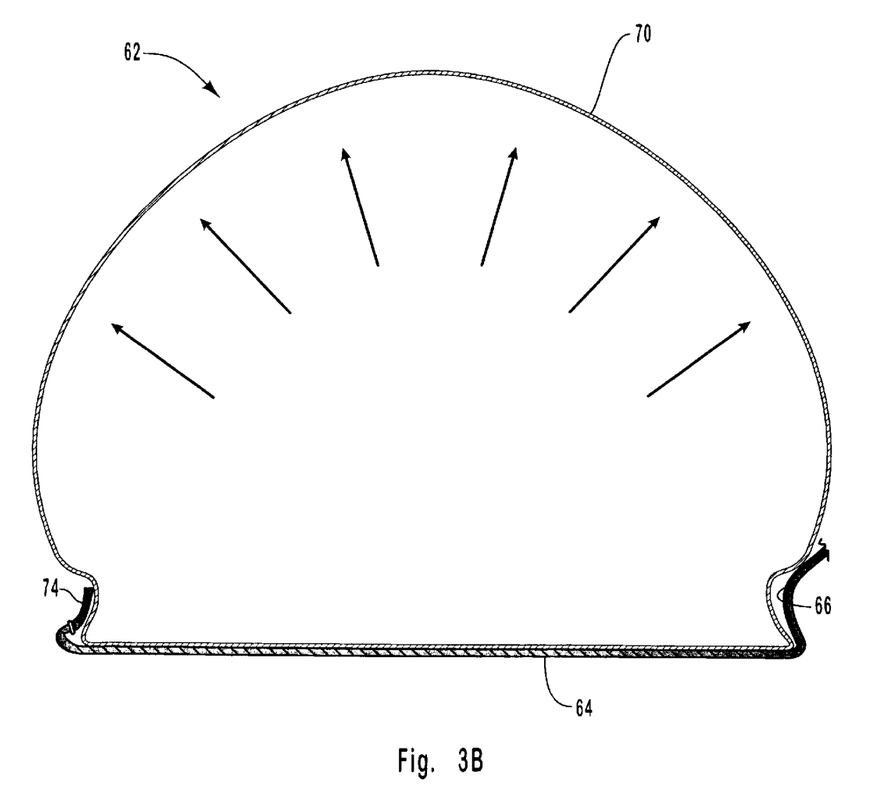
FIG. 3b is a cross-sectional view of an inflatable belt in an inflated state.

The inflatable belt 62 may also comprise a frangible seam 72 that ruptures upon inflation of the inflatable member 70 disposed within the interior cavity 68. The frangible seam 72 may involve sewing, crimping, clamping, or a various other types of fastening devices or techniques to fasten edges 74 of the seat belt webbing 64 together. The strength of the frangible seam 72 may vary depending on the fastening technique used. The frangible seam 72, when broken, enables the inflatable member 70 to properly expand and provide protection to an occupant 18 of a vehicle, as illustrated in FIG. 3b.

Because the seat belt webbing 64 that surrounds the inflatable member 70 is durable and strong, the inflatable member 70 is protected from damage or wear and tear. Conventional inflatable seat belts do not surround the inflatable member or airbag with seat belt webbing to protect the inflatable member from damage. Thus, conventional inflatable seat belts run a greater risk of system failure at deployment.

Figure 4:
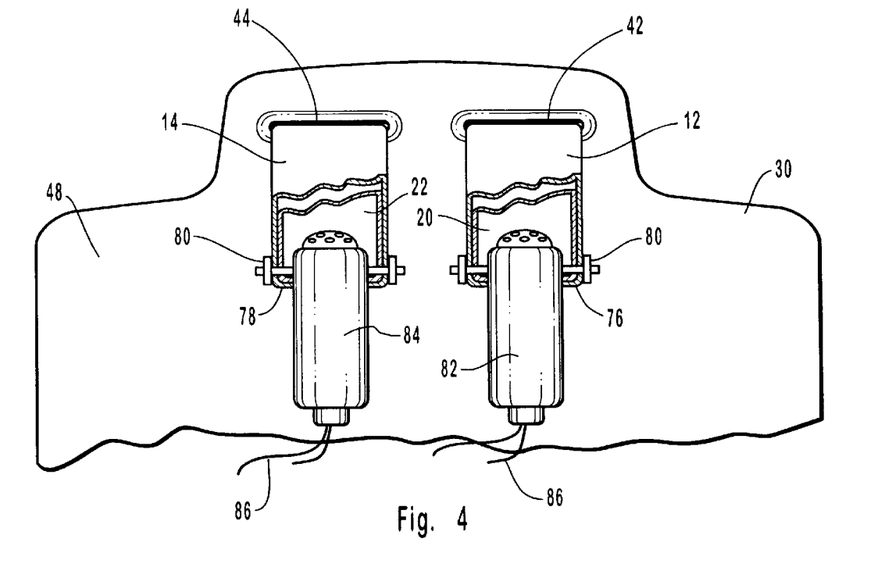
FIG. 4 is a partial rear plan view of an inflatable seat belt system having two inflators.

FIG. 4 depicts a rear plan view of an inflatable seat belt system 10, 50. As illustrated, the first and second shoulder belts 12, 14 are disposed within the first and second openings 42, 44, respectively. The first and second shoulder belts 12, 14 each have a distal end 76, 78, which may be attached to the rear side 48 of the seat 30 using a clamp or other retaining device 80. Alternatively, the distal ends 76, 78 may be attached to other areas within a vehicle, such as the floor (not shown).

The embodiment depicted in FIG. 4 includes a first and second inflator 82, 84. The first inflator 82 may be in fluid communication with the first inflatable member 20, while the second inflator 84 may be in fluid communication with the second inflatable member 22. Each of the inflators 82, 84 may be directly attached to an inflatable member 20, 22, as illustrated, or may be in fluid communication with an inflatable member 20, 22 via a gas guide or diffuser (e.g., tubing or a fluid channeling device) (not shown). Each inflator 82, 84 may also include a wire 86 other communication device to enable receipt of a signal indicating that the vehicle is in an accident situation, triggering inflation of the inflatable members 20, 22. The inflators 82, 84 may be disposed on the rear side 48 of the seat 30, or within the seat 30 or covered to prevent tampering.

Each of the first and second inflators 82, 84 may be independently initiated. That is, the first and second inflators 82, 84 may inflate at different times or inject different amounts of filler medium (e.g., gas or foam) into each corresponding inflatable member 20, 22. For instance, if a vehicle in which the inflatable seat belt system 10, 50 is situated rolls to the right in an accident, the inflatable member 20 to the right of an occupant 18 may deploy more quickly and with greater force to prevent the occupant 18 from slipping through the seat belt system 10, 50 or impacting objects to the right of the occupant 18.

Figure 5:
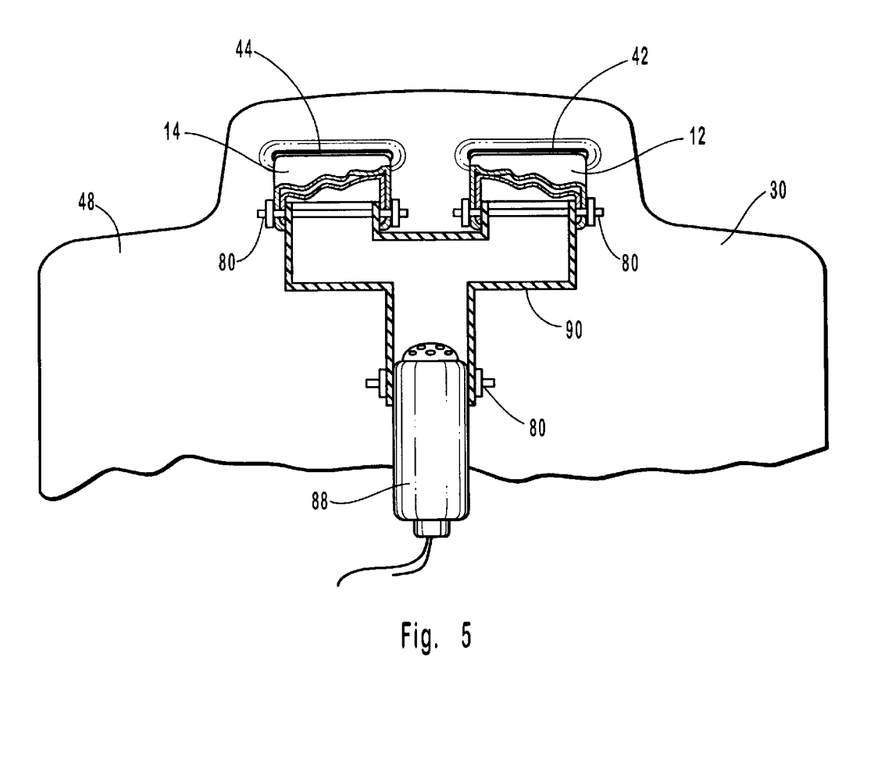
FIG. 5 is a partial rear plan view of an inflatable seat belt system having one inflator.

FIG. 5 is a rear plan view of an inflatable seat belt system 10, 50 that includes a single inflator 88. Again, the first and second shoulder belts 12, 14 may be attached to the rear side 48 of the seat 30 by a clamp or other retaining device 80. As illustrated, the inflator 88 may also be attached to the rear side 48 of the seat 30 using any suitable mechanism or technique (e.g., a clamp 80). Of course, the inflator 88 may be disposed within the seat 30 or covered to prevent tampering. The inflator 88 may be in fluid communication with both the first and second inflatable members 20, 22 using a gas guide or diffuser 90. Gas guides or diffusers 90 are known to those skilled in the art and may include tubing or channel made from, for example, metal or woven nylon.

Figure 6:
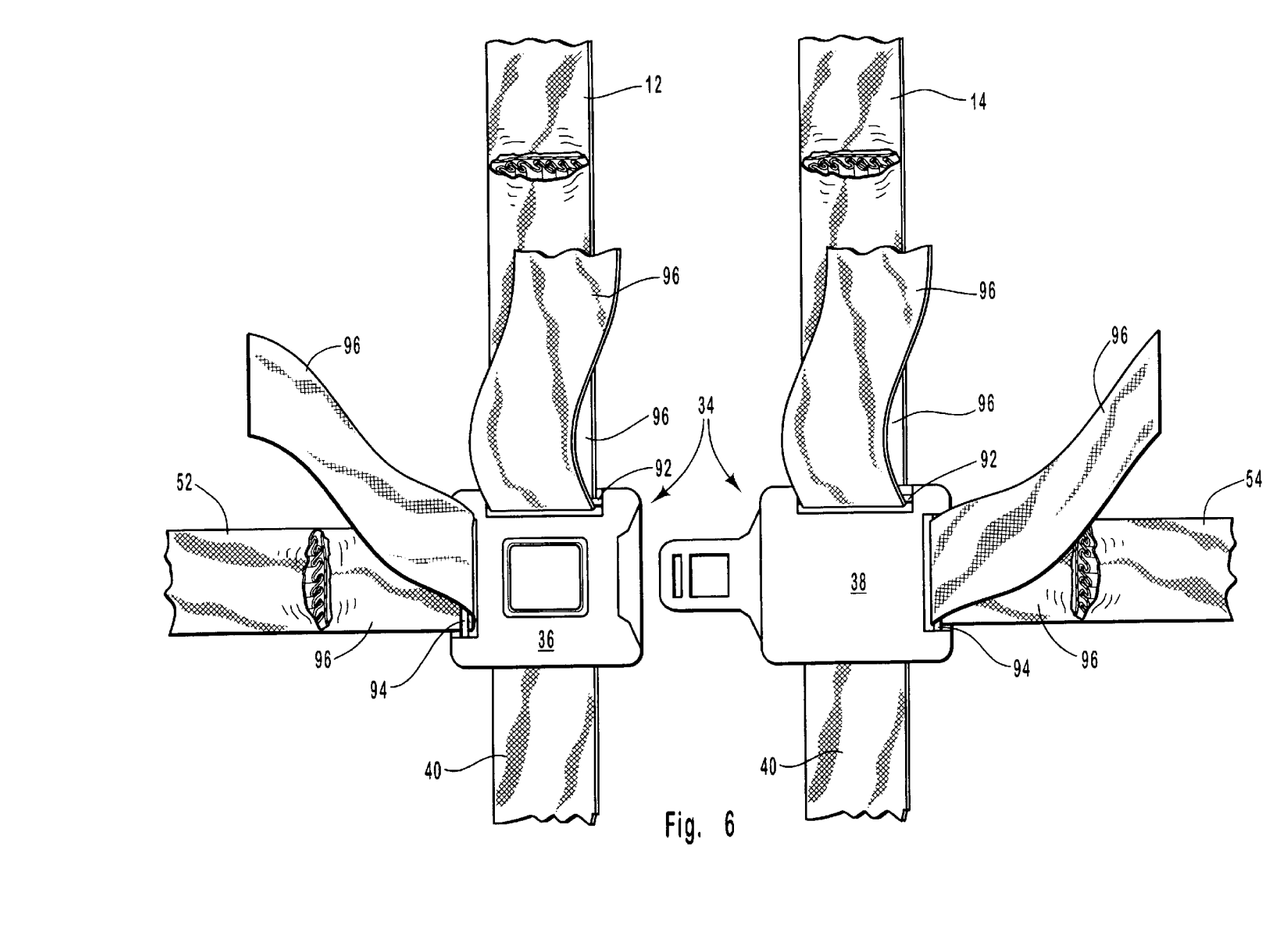
FIG. 6 is a partial front plan view of an inflatable seat belt system including a cinching mechanism.

FIG. 6 illustrates a first and second cinching mechanism 92, 94 disposed within the locking device 34 having a buckle 36 and latch plate 38. The first cinching mechanism 92 may be used to adjust a length of each of the first and second shoulder belts 12, 14 to a particular occupant 18, while the second cinching mechanism 94 may be used to adjust the length of each of the first and second lap belts 52, 54. The cinching mechanisms 92, 94 may be configured in a number of different ways, but each embodiment provides for adjustment during loading of an occupant 18, but locks into place in the event of rapid acceleration or deceleration. Moreover, the inflatable shoulder and lap belts 12, 14, 52, 54 may include a portion 96 of the seat belt webbing that is not inflatable and thus may be freely moved through the cinching mechanism 92, 94.

Because the cinching mechanisms 92, 94 are disposed within the locking device (rather than cinching each belt 12, 14, 52, 54 back to itself, as with conventional inflatable seat belts), an occupant is provided with a wide range of potential lengths of each of the shoulder and lap belts 12, 14, 52, 54. Also, because the cinching mechanisms 92, 94 are located proximate to the occupant's hands, an occupant 18 may easily adjust the length of each belt 12, 14, 52, 54.

Of course, various other devices or techniques may be used to couple each of the belts to the locking device 34 within the scope of this invention. For instance, an anti-submarining belt 40 may be coupled to the locking device 34 by inserting the belt 40 through an opening or around a post (not shown) in the locking device 34 and then sewing, weaving, or fastening the belt 40 to itself to form a loop. Of course, these devices and techniques may be used in connection with other belts, such as the first and second inflatable shoulder belts 12, 14, the first and second lap belts 24, 26, and the first and second inflatable lap belts 52, 54.

Figure 7:
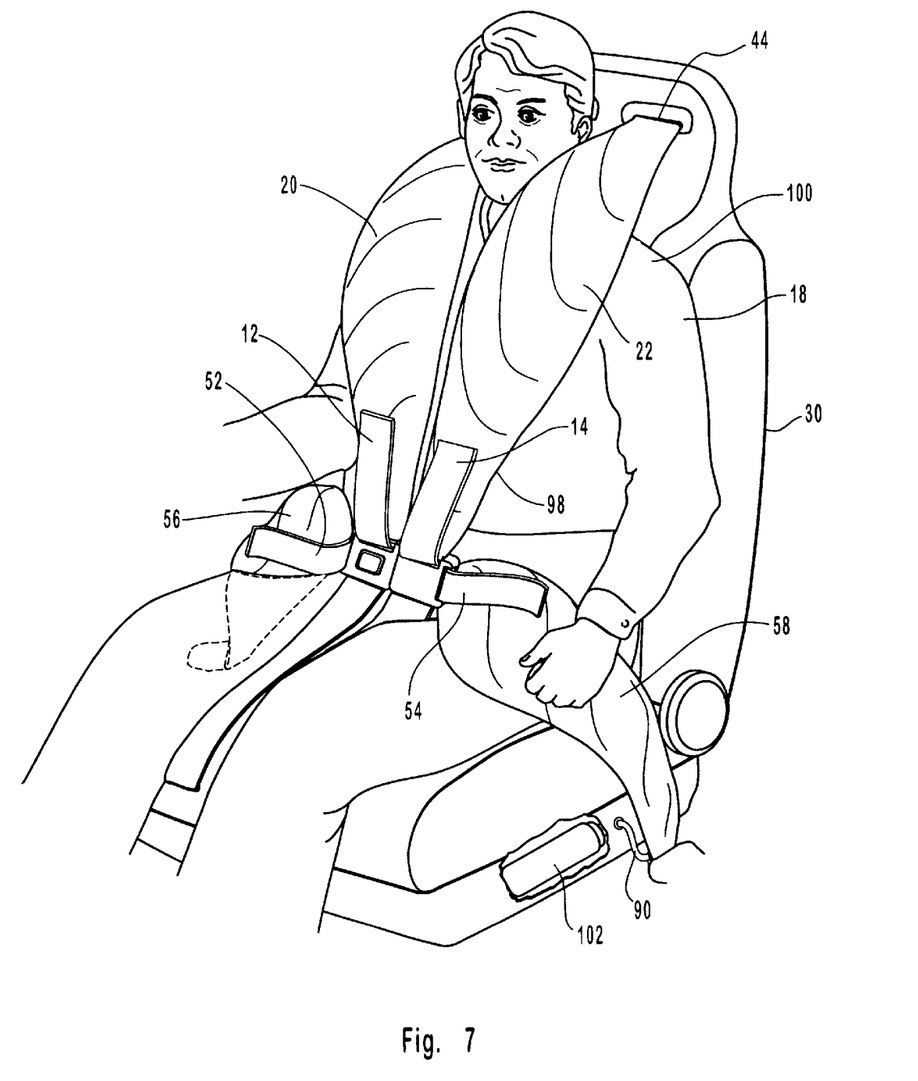
FIG. 7 is a perspective view of an inflatable seat belt system in an inflated state.

FIG. 7 is a perspective view of an inflatable seat belt system 50 in an inflated state. The depicted embodiment includes both inflatable seat belts 12, 14 and inflatable lap belts 52, 54. More particularly, the first, second, third, and fourth inflatable members 20, 22, 56, 58 are each shown in an inflated state. As illustrated, the first and second inflatable members are quite long and are configured to protect at least a portion of the abdomen 98 and shoulders 100 of an occupant 18 of the seat 30 in an impact.

The third and fourth inflatable members 56, 58 for the inflatable lap belts may be in fluid communication with one or more of the inflators 82, 84, 88 depicted in FIGS. 4–5. Alternatively, the third and fourth inflatable members 56, 58 for may be in fluid communication with one or more inflators 102 disposed near the lab belts (e.g., underneath the seat or within cavity disposed within the vehicle) using a gas guide or diffuser 90, as illustrated in FIG. 7.

The inflatable seat belt system 10, 50 presents a significant advancement in the art in that it provides superior protection to inflatable members 70 of an inflatable seat belt system 10, 50 by surrounding each inflatable member 70 with seat belt webbing 64. In addition, in one embodiment, a cinching mechanism 92, 94 for adjusting the length of an inflatable belt 62 is conveniently located for adjustment by an occupant 18. Also, openings 42, 44 within the seat 30, through which inflatable shoulder belts 12, 14 may pass, provide additional stability to the inflatable seat belt system 10, 50 and help to maintain the inflatable shoulder belts 12, 14 in the correct position to protect an occupant 18 during an accident.

In view of the foregoing, present invention may be embodied in other specific forms without departing from its scope or essential characteristics. The described embodiments are to be considered in all respects only illustrative, not restrictive. The scope of the invention is, therefore, indicated by the appended claims rather than by the foregoing description. All changes that come within the meaning and range of equivalency of the claims are to be embraced within their scope.

What is claimed is:

1. An inflatable seat belt system, comprising:
   a first shoulder belt comprising seat belt webbing having an interior surface defining an interior cavity;

a first inflatable member at least partially disposed within the interior cavity of the first shoulder belt;

a locking device having a buckle and a latch plate, the locking device being coupled to the first shoulder belt; and a cinching mechanism disposed within the locking device for adjusting a length of the first shoulder belt, the locking device and cinching mechanism being located proximate an occupant's abdomen when the latch plate and buckle are interlocked.

2. The inflatable seat belt system of claim 1, further comprising an inflator for inflating the first inflatable member.

3. The seat belt system as defined in claim 1, further comprising at least one anti-submarining belt coupled to the locking device.

4. The seat belt system as defined in claim 1, further comprising a first and a second lap belt, the first and the second lap belt each being coupled to the locking device.

5. The seat belt system as defined in claim 4, further comprising a first and a second retractor, the first retractor for securing the first lap belt to a vehicle and the second retractor for securing the second lap belt to the vehicle.

6. The seat belt system as defined in claim 4, further comprising a third and a fourth inflatable member, wherein the first and second lap belts each comprise seat belt webbing having an interior surface defining an interior cavity, the third inflatable member at least partially disposed within the interior cavity of the first lap belt and the fourth inflatable member at least partially disposed within the interior cavity of the second lap belt.

7. The seat belt system as defined in claim 4, further comprising a cinching mechanism disposed within the locking device for adjusting a length of each of the first and second lap belts.

8. The seat belt system as defined in claim 1, wherein the seat belt webbing further comprises a frangible seam that ruptures upon inflation of the first inflatable member at least partially disposed within the interior cavity of the first shoulder belt.

9. The seat belt system as defined in claim 1, further comprising:

a second shoulder belt comprising seat belt webbing having an interior surface defining an interior cavity, the second shoulder belt being coupled to the locking device; and a second inflatable member at least partially disposed within the interior cavity of the second shoulder belt.

10. The seat belt system as defined in claim 9, further comprising a seat for receiving an occupant, the seat having a first and a second opening, wherein the first opening receives the first shoulder belt and the second opening receives the second shoulder belt.

11. The seat belt system as defined in claim 10, wherein the seat further comprises a fixed headrest, and wherein the first and second openings are disposed within the fixed headrest.

12. The seat belt system as defined in claim 10, wherein each of the first and second shoulder belts further comprises a distal end, each distal end being attached to a rear side of the seat.

13. The seat belt system as defined in claim 10, further comprising at least one inflator for inflating at least one of the first and the second inflatable members, wherein the at least one inflator is attached to a rear side of the seat.

14. The seat belt system as defined in claim 9, further comprising a first and a second inflator, wherein the first inflator is in fluid communication with the first inflatable member and the second inflator is in fluid communication with the second inflatable member.

15. An inflatable seat belt system, comprising:

a first and a second shoulder belt, each shoulder belt comprising seat belt webbing having an interior surface defining an interior cavity;

a first and a second inflatable member, the first inflatable member disposed within the interior cavity of the first shoulder belt and the second inflatable member disposed within the interior cavity of the second shoulder belt;

at least one inflator for inflating the first and second inflatable members;

a first and a second lap belt;

a locking device comprising a buckle and a latch plate, the locking device being coupled to the first and second shoulder belts and the first and the second lap belts; and a cinching mechanism disposed within the locking device for adjusting a length of the first shoulder belt, the locking device and cinching mechanism being located proximate an occupant's abdomen when the latch plate and buckle are interlocked.

16. The seat belt system as defined in claim 15, further comprising at least one anti-submarining belt.

17. The seat belt system as defined in claim 15, further comprising a third and a fourth inflatable member, wherein the first and second lap belts each comprise seat belt webbing having an interior surface defining an interior cavity, the third inflatable member disposed within the interior cavity of the first lap belt and the fourth inflatable member disposed within the interior cavity of the second lap belt.

18. The seat belt system as defined in claim 15, further comprising a seat for receiving an occupant, the seat having a fixed headrest and a first and a second opening disposed within the headrest, wherein the first opening receives the first shoulder belt and the second opening receives the second shoulder belt.

19. The seat belt system as defined in claim 18, wherein the at least one inflator is attached to a rear side of the seat.

20. An inflatable seat belt system, comprising:

a first and a second shoulder belt, each shoulder belt comprising seat belt webbing having an interior surface defining an interior cavity;

a first and a second inflatable member, the first inflatable member being disposed within the interior cavity of the first shoulder belt and the second inflatable member being disposed within the interior cavity of the second shoulder belt;

a first and a second inflator, the first inflator being in fluid communication with the first inflatable member and the second inflator being in fluid communication with the second inflatable member;

a first and a second lap belt;

a locking device comprising a buckle and a latch plate, the locking device being coupled to the first and second shoulder belts and the first and the second lap belts; and a cinching mechanism disposed within the locking device for adjusting a length of each of the first and second shoulder belts, the locking device and cinching mechanism being located proximate an occupant's abdomen when the latch plate and buckle are interlocked.

21. The seat belt system as defined in claim 20, further comprising at least one anti-submarining belt coupled to the locking device.

22. The seat belt system as defined in claim 20, further comprising a third and a fourth inflatable member, wherein the first and second lap belts each comprise seat belt webbing having an interior surface defining an interior cavity, the third inflatable member being disposed within the interior cavity of the first lap belt and the fourth inflatable member being disposed within the interior cavity of the second lap belt.

23. The seat belt system as defined in claim 20, further comprising a seat for receiving an occupant, the seat having a fixed headrest and a first and a second opening disposed within the headrest, wherein the first opening receives the first shoulder belt and the second opening receives the second shoulder belt.

24. The seat belt system as defined in claim 23, wherein the first and second inflators are attached to a rear side of the seat.

25. The seat belt system as defined in claim 23, wherein each of the first and second shoulder belts further comprises a distal end, each distal end being attached to a rear side of the seat.

26. The seat belt system as defined in claim 23, wherein each of the first and second inflatable members, when inflated, is configured to protect at least a portion of an abdomen and a shoulder of an occupant of a seat.

* * * * *